(12) United States Patent
McLamb

(10) Patent No.: US 6,499,479 B1
(45) Date of Patent: Dec. 31, 2002

(54) BARBECUE GRILL ACCESSORY

(76) Inventor: Nathan E. McLamb, 12859 Raleigh Rd., Benson, NC (US) 27504

( * ) Notice: Subject to any disclaimer, the term of this patent is extended or adjusted under 35 U.S.C. 154(b) by 0 days.

(21) Appl. No.: 09/790,147

(22) Filed: Feb. 21, 2001

(51) Int. Cl.7 ................................................ F24C 3/00
(52) U.S. Cl. .................. 126/41 R; 126/25 R; 126/39 R; 126/51; 99/444; 99/446; 99/447
(58) Field of Search .............................. 126/41 R, 25 R, 126/39 R, 51; 99/447, 444, 445, 446, 393, 400, 401

(56) References Cited

U.S. PATENT DOCUMENTS

| | | | | |
|---|---|---|---|---|
| 1,010,169 A | * | 11/1911 | Noreck | |
| 1,103,992 A | * | 7/1914 | Murray | |
| 3,348,472 A | * | 10/1967 | Antetsberger et al. | |
| 3,418,921 A | * | 12/1968 | Fautz | |
| 4,402,300 A | * | 9/1983 | Houck | |
| 4,727,853 A | * | 3/1988 | Stephen et al. | |
| 5,284,671 A | * | 2/1994 | Stewart | |
| 5,368,009 A | * | 11/1994 | Jones | |
| D390,062 S | * | 2/1998 | Bohannon | |
| 6,161,534 A | * | 12/2000 | Kronman | |

* cited by examiner

Primary Examiner—Carl D. Price
(74) Attorney, Agent, or Firm—Joseph N. Breaux

(57) ABSTRACT

A barbecue grill accessory that includes an inverted V-shaped burner cover having drip channels formed along opposed side edges thereof that are each formed to channel drippings toward a first end of the burner cover. A method of using the barbecue grill accessory is also provided.

1 Claim, 3 Drawing Sheets

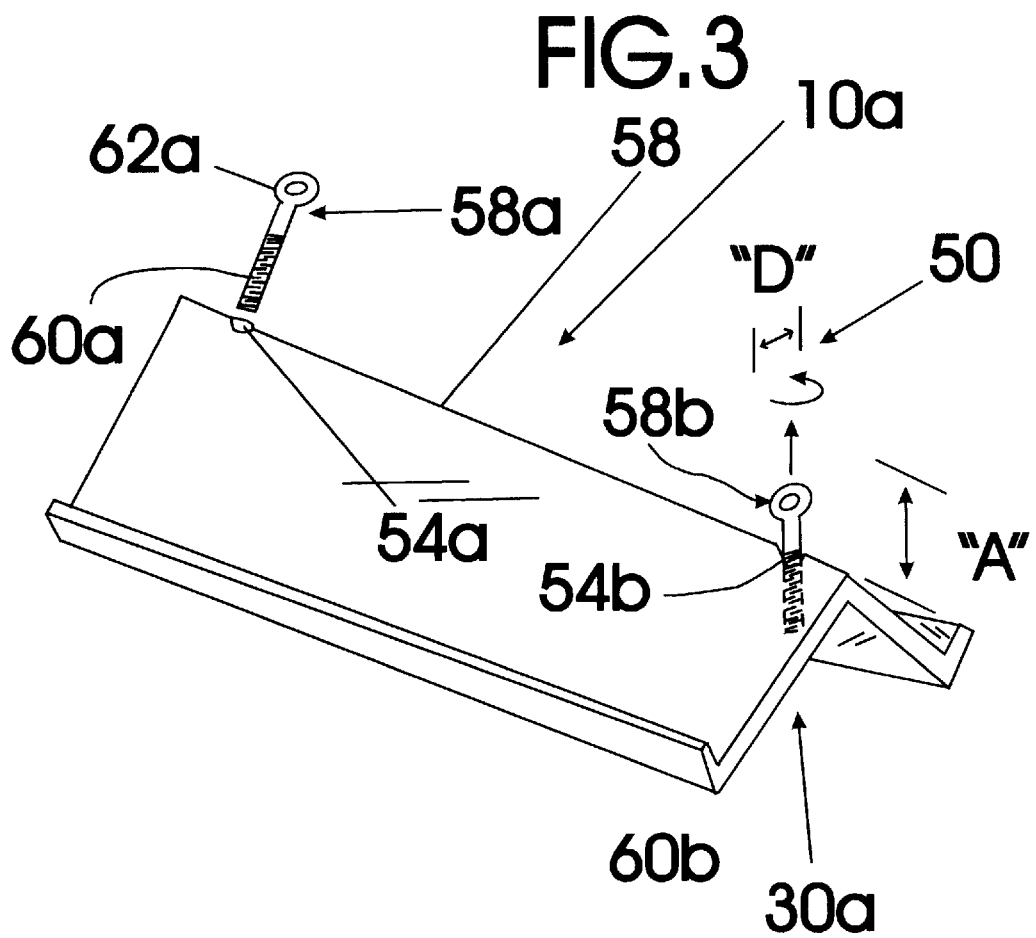

BARBECUE GRILL ACCESSORY

TECHNICAL FIELD

The present invention relates to barbecue grills and more particularly to a barbecue grill accessory and barbecue method wherein the barbecue accessory includes an inverted V-shaped burner cover having drip channels formed along opposed side edges thereof that are each formed to channel drippings toward a first end of the burner cover and the barbecue method includes the steps of 1) providing a barbecue grill having a food support grill and a heat source positioned beneath the food support grill; 2) positioning the the burner cover between the heat source and the food support grill of the barbecue grill; and 3) positioning items to be cooked on the food support grill, the items to be cooked dripping fluids onto the burner cover generating smoke and being channeled away from the heat source such that flame flare ups of heat source are minimized.

BACKGROUND ART

Many individuals do not barbecue because they are afraid they will be injured when a flame flare up occurs as the result of grease dripping from cooking food items onto the barbecue heat source, such as a gas burner or a charcoal fire. In addition, these flame flare ups can generate excessive heat which results in burning of the food items and/or generating undesirable flavors in the food. It would be a benefit to have a barbecue accessory and/or a method of barbecuing food items that would reduce or eliminate flame flare ups as described.

GENERAL SUMMARY DISCUSSION OF INVENTION

It is thus an object of the invention to provide a barbecue grill accessory for barbecue grill assemblies that have a heat source and a food support grill supported above the heat source at various heights by a number of groups of vertically spaced inwardly projecting tabs; the barbecue accessory including an inverted V-shaped burner cover having drip channels formed along opposed side edges thereof that are each formed to channel drippings toward a first end of the burner cover; the burner cover being sized such that the opposed side edges may be supported by the inwardly projecting tabs such that the burner cover is positioned between the heat source and the food support grill. The phrase "inwardly projecting" is used herein to mean away from an attached inner wall into the direction of an area over the heat source.

It is a further object of the invention to provide a barbecuing method that includes the steps of 1) providing a barbecue grill having a heat source and a food support grill supported above the heat source at various heights by a number of groups of vertically spaced inwardly projecting tabs; 2) providing a barbecue grill accessory including an inverted V-shaped burner cover having drip channels formed along opposed side edges thereof that are each formed to channel drippings toward a first end of the burner cover; the burner cover being sized such that the opposed side edges may be supported by the inwardly projecting tabs of the provided barbecue grill such that the burner cover is positionable between the heat source and the food support grill; 3) positioning the burner cover between the heat source and the food support grill of the barbecue grill; and 4) positioning items to be cooked on the food support grill, the items to be cooked dripping fluids onto the burner cover generating smoke and being channeled away from the heat source such that flame flare ups of heat source are minimized.

Accordingly, a barbecue grill accessory is provided. The a barbecue grill accessory for barbecue grill assemblies that have a heat source and a food support grill supported above the heat source at various heights by a number of groups of vertically spaced inwardly projecting tabs; the barbecue accessory including an inverted V-shaped burner cover having drip channels formed along opposed side edges thereof that are each formed to channel drippings toward a first end of the burner cover; the burner cover being sized such that the opposed side edges may be supported by the inwardly projecting tabs such that the burner cover is positioned between the heat source and the food support grill.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a perspective view of a second embodiment of the barbecue grill accessory of the present invention.

EXEMPLARY MODE FOR CARRYING OUT THE INVENTION

Figure 1:
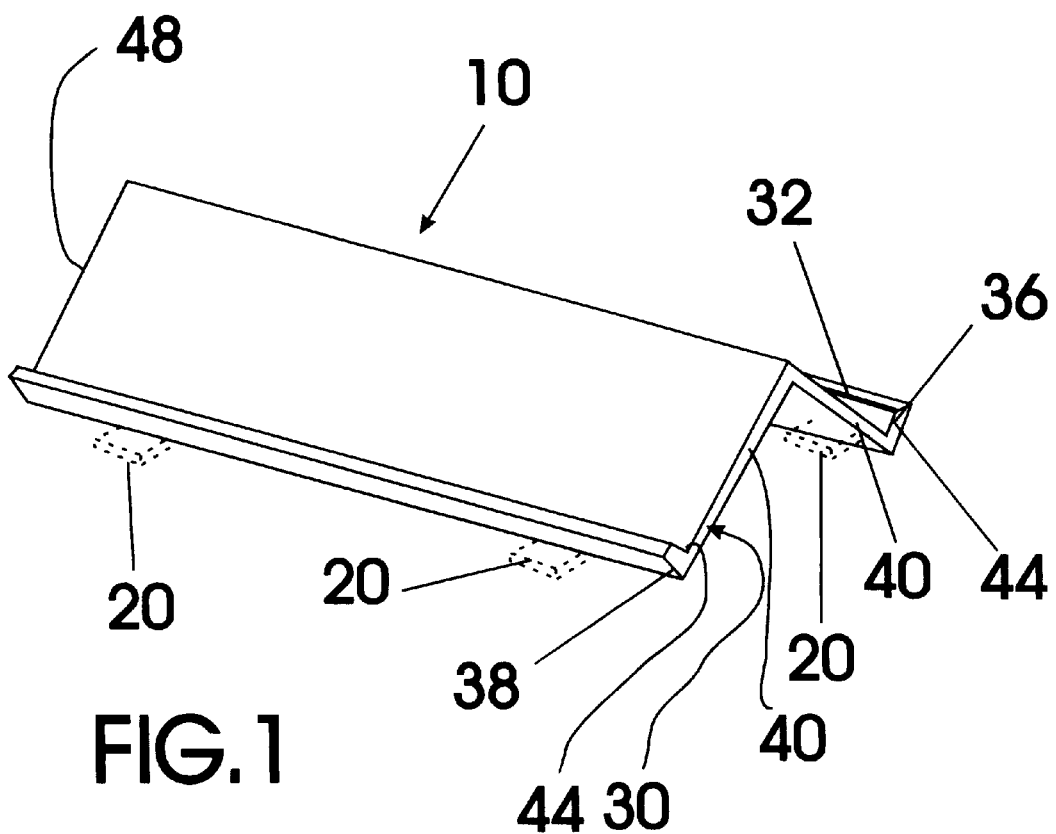
FIG. 1 is a perspective view of an exemplary embodiment of the barbecue grill accessory of the present invention.
Figure 2:
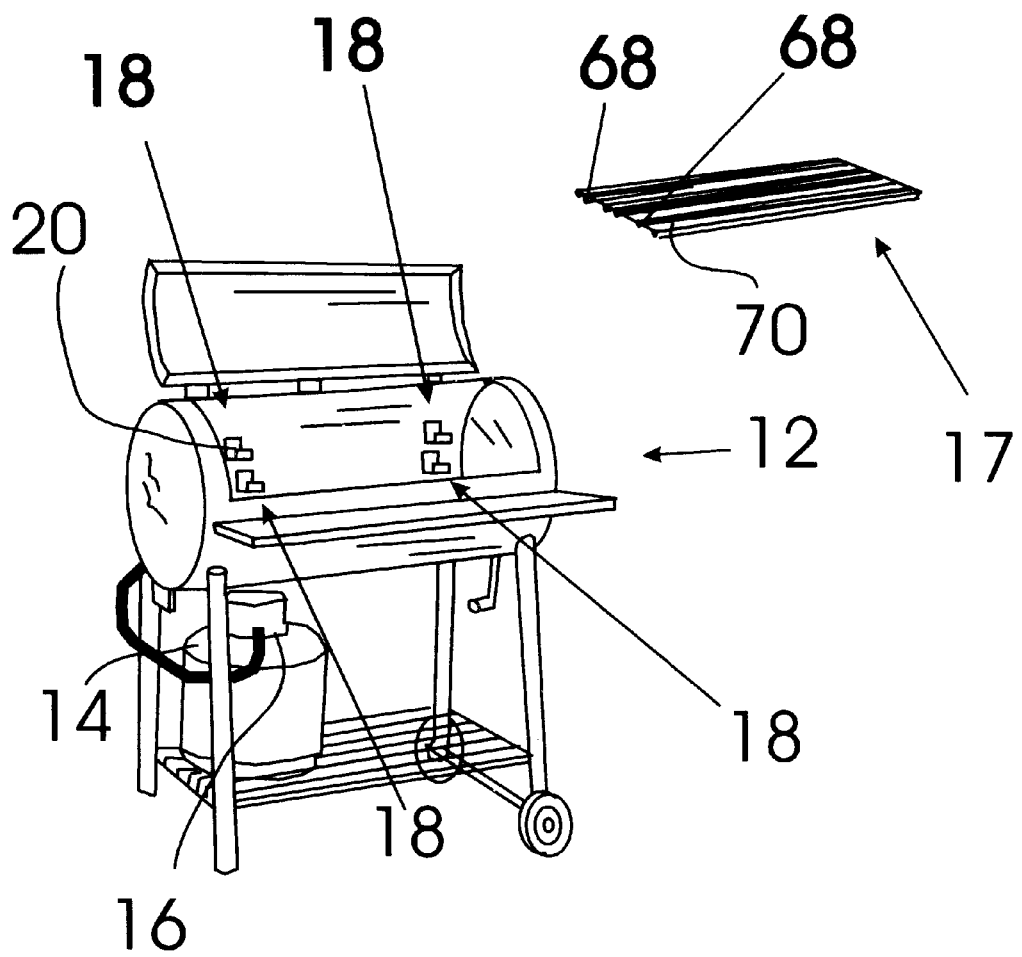
FIG. 2 is a perspective view of a representative barbecue grill with which the first exemplary embodiment of the barbecue grill accessory is used.

FIGS. 1 and 2 show various aspects of a first exemplary embodiment of the barbecue grill accessory of the present invention generally designated 10. Barbecue grill accessory 10 is adapted for barbecue grills, generally designated 12, that have a heat source 14, such as a gas burner 16, and a food support grill 17 that is supported above the heat source 14 at various heights by a number of groups 18 of vertically spaced inwardly projecting tabs 20. Barbecue accessory 10 is constructed of a metal such as aluminum, carbon steel, iron, or stainless steel and includes an inverted V-shaped burner cover, generally designated 30 having drip channels 32,34 formed along opposed side edges 36,38 thereof that are each formed to channel drippings toward a first end 40 of burner cover 30 by slanting the bottoms 44 of channels 32,34 such that the bottoms 44 of channels 32,34 are lower at first end 40 of burner cover 30 than at second end 48 of burner cover 30. In this embodiment burner cover 10 is sized such that the opposed side edges 36,38 may be supported by the inwardly projecting tabs 20 of barbecue grill 12 such that the burner cover 30 is positioned between the heat source 14 and the food support grill 17 when the food support grill is also supported by tabs 20.

An exemplary barbecuing method of the present invention includes the steps of 1) providing a barbecue grill 12 having a heat source 14 and a food support grill 17 supported above the heat source 14 at various heights by a number of groups 18 of vertically spaced inwardly projecting tabs 20; 2) providing a barbecue grill accessory 10 as described herein above in detail; 3) positioning the burner cover 30 between the heat source 14 and the food support grill 17 of the barbecue grill 12; and 4) positioning items to be cooked on the food support grill 17, the items to be cooked dripping fluids onto the burner cover 30 generating smoke and being channeled away from the heat source 14 by channels 32,34 such that flame flare ups of heat source 14 are minimized.

A second exemplary embodiment of the barbecue accessory of the present invention is shown in FIG. 3 and designated 10a. Barbecue accessory 10a is shaped the same as barbecue accessory 10 but may vary in size and includes a height adjustable suspension assembly, generally designated 50, for suspending barbecue accessory 10a between heat source 14 and food support grill 17. In this embodiment height adjustable suspension assembly 50 includes two internally threaded holes 54a,54b formed through the vertex 58 of cover plate 30a and a pair of eye bolts 58a,58b that each include a threaded bolt portion 60a,60b that is threadable into a respective internally threaded holes 54a,54b and an eye portion 62a,62b that has an exterior diameter "D" of greater than one-third in and in particular cases greater than the thickness of gaps formed through the parallel grill wires 68 (FIG. 2) such that eye portion 62a,62b may pass between the gap 70 between grill wires 68 when oriented in a first direction and will not pass through the gap 70 when oriented at a ninety degree angle to the first direction. It can be seen, therefore, that cover plate 30a is supportable by food support grill 17 between food support grill 17 and heat source 14 by inserting eye portions 62a,62b between selected gaps 70 and then rotating eye portions 62a,62b so that they will not pass through the gap 70.

It can be seen from the preceding description that a barbecue grill accessory has been provided.

It is noted that the embodiment of the barbecue grill accessory described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. In a barbeque grill having a heat source and a food support grill that has a number of parallel oriented grill wires equally spaced apart to form a grill gap of equal distance between each pair of adjacent grill wires and wherein the food support grill is positioned above the heat source, the improvement comprising:

providing an inverted V-shaped metal burner cover having a centrally positioned vertex and drip channels formed along opposed side edges thereof that are each formed to channel drippings toward a first end of the burner cover; and two support members each including a threaded end portion threadably engaged with a respective one of two internally threaded hole formed through the vertex of the burner cover and an elongated head portion connected to a top end of the threaded end portion and being of a width less than the grill gap and of a length longer than the grill gap such that when the head portion is lengthwise oriented in parallel with two adjacent grill wires, the head portion is positionable through the grill gap there between and when the head portion is lengthwise oriented perpendicular to two adjacent grill wires, the head portion is not positionable through the grill gap there between;

each of the two support members extending upward from the vertex of the inverted V-shaped metal burner cover and through a grill gap such that the inverted V-shaped metal burner cover is supported by contact between the head portions of the two support members the two respective pairs of spaced apart, adjacent grill wires of the food support grill and suspended between the heat source and the food support grill;

the distance between the vertex of the inverted V-shaped metal burner cover and the food support grill being adjustable by rotation of the head portion.

* * * * *